(12) United States Patent
Guen (10) Patent No.: US 9,312,531 B2
(45) Date of Patent: Apr. 12, 2016

(54) SECONDARY BATTERY

(71) Applicant: SAMSUNG SDI CO., LTD., Yongin-si, Gyeonggi-do (KR)

(72) Inventor: Minhyung Guen, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 321 days.

(21) Appl. No.: 14/087,153

(22) Filed: Nov. 22, 2013

(65) Prior Publication Data

US 2014/0377600 A1 Dec. 25, 2014

(30) Foreign Application Priority Data

Jun. 19, 2013 (KR) ........................ 10-2013-0070352

(51) Int. Cl.
*H01M 2/34* (2006.01)
*H01M 2/04* (2006.01)
*H01M 2/26* (2006.01)
*H01M 2/30* (2006.01)

(52) U.S. Cl.
CPC ............ *H01M 2/345* (2013.01); *H01M 2/0456* (2013.01); *H01M 2/26* (2013.01); *H01M 2/30* (2013.01); *H01M 2200/20* (2013.01)

(58) Field of Classification Search
None
See application file for complete search history.

(56) References Cited

U.S. PATENT DOCUMENTS

| 2012/0070705 A1* | 3/2012 | Kim | ........................ | H01M 2/043 429/61 |
| 2012/0214030 A1* | 8/2012 | Guen | .................. | H01M 2/0404 429/61 |
| 2013/0011703 A1* | 1/2013 | Kim | ........................ | H01M 2/30 429/61 |
| 2013/0029190 A1* | 1/2013 | Kim | ........................ | H01M 2/34 429/61 |

\* cited by examiner

*Primary Examiner* — Patrick Ryan
*Assistant Examiner* — Lucas J O Donnell
(74) *Attorney, Agent, or Firm* — Lee & Morse, P.C.

(57) ABSTRACT

A secondary battery is provided, including an electrode assembly, a case accommodating the electrode assembly, a cap assembly, and an electrode terminal portion. The cap assembly includes a cap plate covering the case, an inversion plate formed in the cap plate, and an insulation plate having a first side connected to the inversion plate and a second side positioned on the cap plate. The inversion plate is configured to be inverted when the internal pressure of the case is greater than or equal to a critical level. The electrode terminal portion includes a fastening part electrically connected to the electrode assembly and a short-circuit member electrically connected to the fastening part. The short-circuit member is configured to make contact with a top portion of the insulation plate when an elastic force is applied on the short-circuit member toward the cap plate.

19 Claims, 6 Drawing Sheets

SECONDARY BATTERY

CROSS-REFERENCE TO RELATED APPLICATION

Korean Patent Application No. 10-2013-0070352, filed on Jun. 19, 2013, in the Korean Intellectual Property Office, and entitled: "Secondary Battery," is incorporated by reference herein in its entirety.

BACKGROUND

1. Field

Embodiments relate to a secondary battery.

2. Description of the Related Art

Unlike a primary battery which cannot be recharged, a secondary battery can be repeatedly charged and discharged. Low capacity batteries that use single battery cells are used as power sources for various portable small-sized electronic devices, e.g., cellular phones, camcorders, and so forth. High power batteries that use tens of battery cells connected to each other in a battery pack are used as power sources for larger systems, e.g., electric scooters, hybrid vehicles, electric vehicles, and so forth.

A secondary battery may be classified into different types, e.g., cylindrical batteries, prismatic batteries, and so forth. A secondary battery is generally configured by accommodating an electrode assembly having a positive plate and a negative plate and a separator as an insulator interposed therebetween in a case with an electrolyte and installing a cap plate in the case. A positive terminal and a negative terminal are connected to the electrode assembly and are exposed and protruded outwardly through the cap plate.

SUMMARY

One or more embodiments are directed to providing a secondary battery including an electrode assembly, a case accommodating the electrode assembly, a cap assembly including a cap plate covering the case, an inversion plate formed in the cap plate and inverted when the internal pressure of the case is greater than or equal to a critical level, and an insulation plate having one side connected to the inversion plate and the other side positioned on the cap plate, and an electrode terminal portion including a fastening part electrically connected to the electrode assembly and a short-circuit member electrically connected to the fastening part and making contact with a top portion of the insulation plate with an elastic force applied toward the cap plate.

The electrode terminal portion may further include a current collector electrically connected to the electrode assembly, and a fastening terminal electrically connected to the current collector and the fastening part.

The current collector may have a fuse region having a sectional area smaller than the other area of the current collector.

The cap plate may include a fixing hole in which the inversion plate is installed, the inversion plate including a concave portion configured to be invertible and an edge portion fixed to the fixing hole, and a notch is formed at a boundary portion of the concave portion and the edge portion.

The notch may be formed on the inversion plate.

The insulation plate may be disposed to be parallel to the cap plate.

One side of the insulation plate may be connected to a central portion of the inversion plate.

The cap assembly may further include a spacer connecting the central portion of the inversion plate and the one side of the insulation plate.

The spacer may have a predetermined height so as to allow the insulation plate and the cap plate to be parallel to each other.

During an inverting operation, the inversion plate may be inverted in a direction away from the electrode assembly, and the insulation plate may be shifted in a horizontal direction with respect to the cap plate, so that the short-circuit member electrically contacts the cap plate.

A height of the inversion plate after being inverted may be greater than a height of the inversion plate before being inverted.

The fastening part and the short-circuit member are integrally formed.

The short-circuit member may have a thickness greater than that of the inversion plate.

The short-circuit member may include one or more first bent portions bent in a first direction and one or more second bent portions bent in a second direction opposite to the first direction between the first bent portions.

The first direction may be a direction away from the cap plate and the second direction may be a direction approaching to the cap plate.

The secondary battery may further include an insulation member disposed between the electrode terminal portion and the top portion of the cap plate and insulating the electrode terminal portion from the cap plate.

One side of the short-circuit member may be electrically connected to the fastening part, an engagement groove may be formed at the other side of the short-circuit member, and an engagement protrusion may be formed at a portion of the insulation member corresponding to the engagement groove.

The engagement protrusion may be inserted into the engagement groove to apply a predetermined pressure to the short-circuit member in a direction approaching to the cap plate.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. Like reference numerals refer to like elements throughout.

Figure 1:
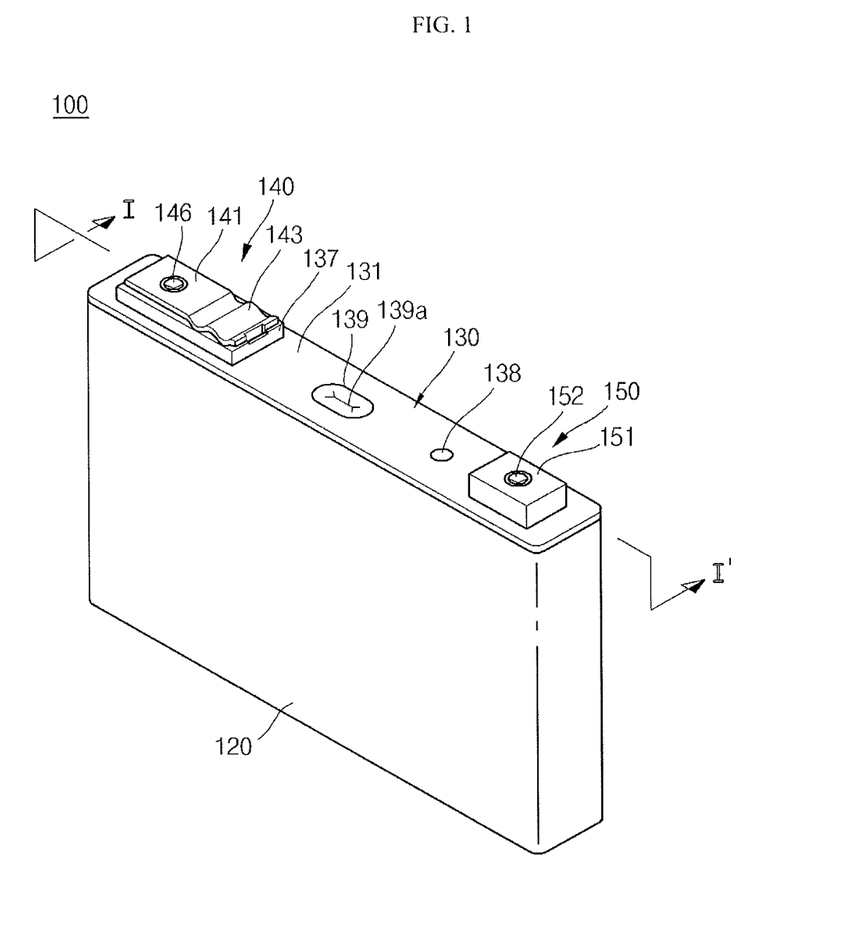
FIG. 1 illustrates a perspective view of a secondary battery according to an embodiment.
Figure 2:
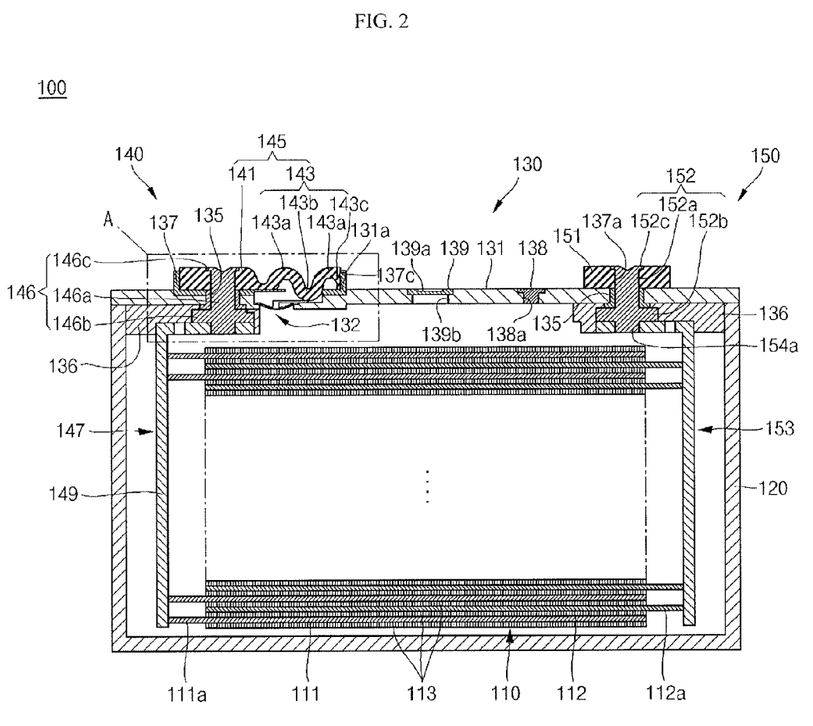
FIG. 2 illustrates a sectional view of the secondary battery taken along the line I-I' of FIG. 1.
Figure 3:
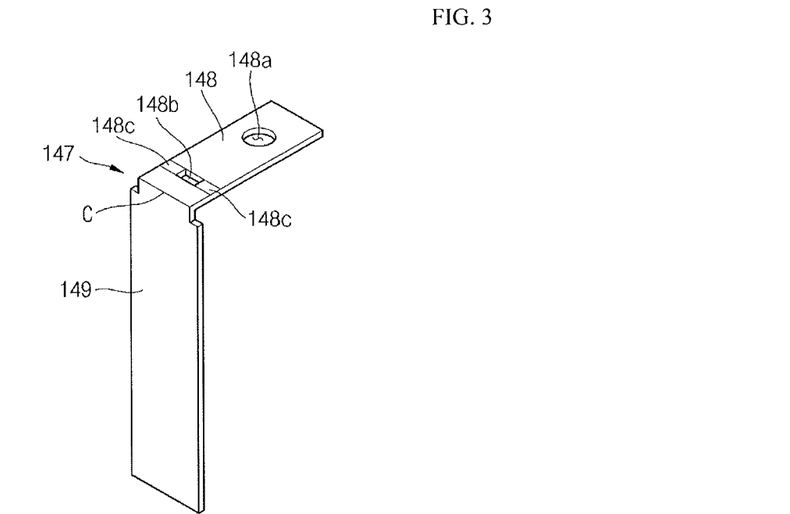
FIG. 3 illustrates a perspective view of a first current collector having a fuse region according to an embodiment.
Figure 4:
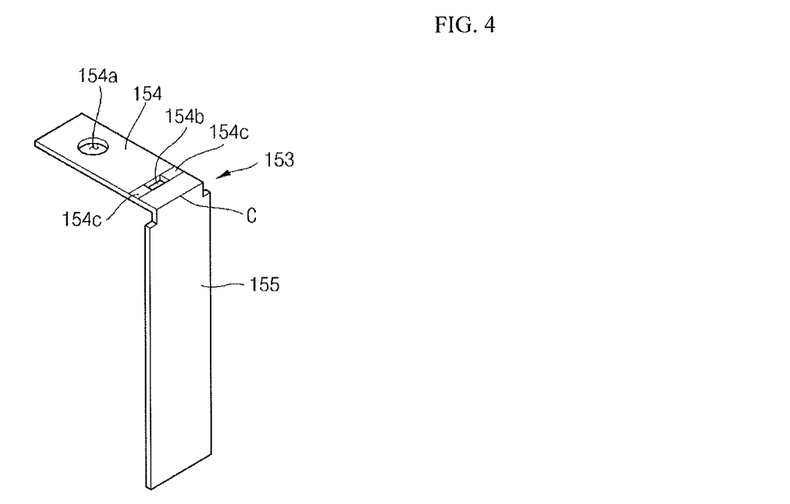
FIG. 4 illustrates a perspective view of a second current collector having a fuse region according to an embodiment.
Figure 5:
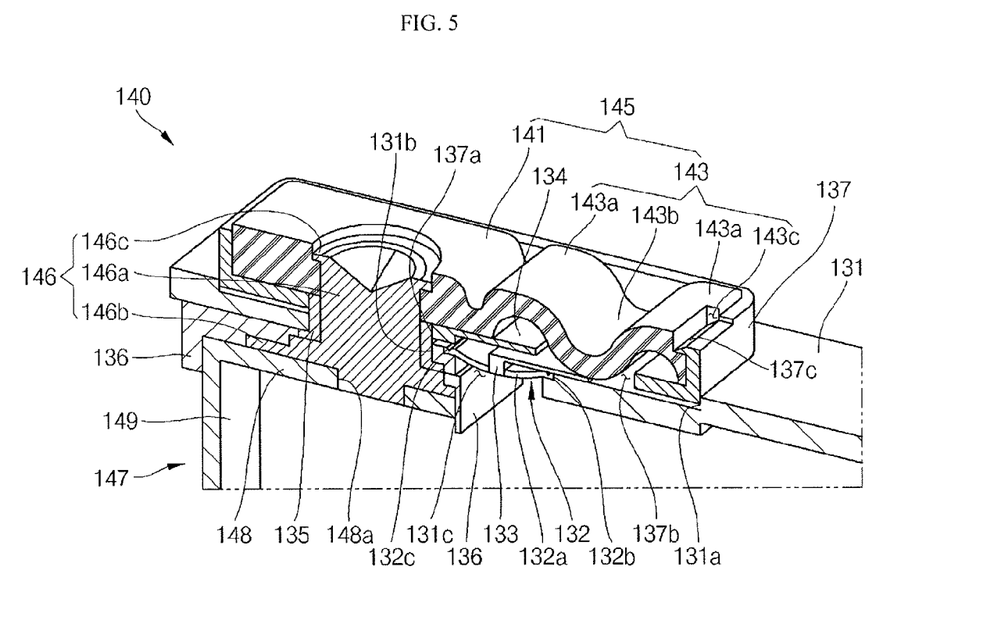
FIG. 5 illustrates a perspective sectional view of a portion 'A' of FIG. 2.
Figure 6:
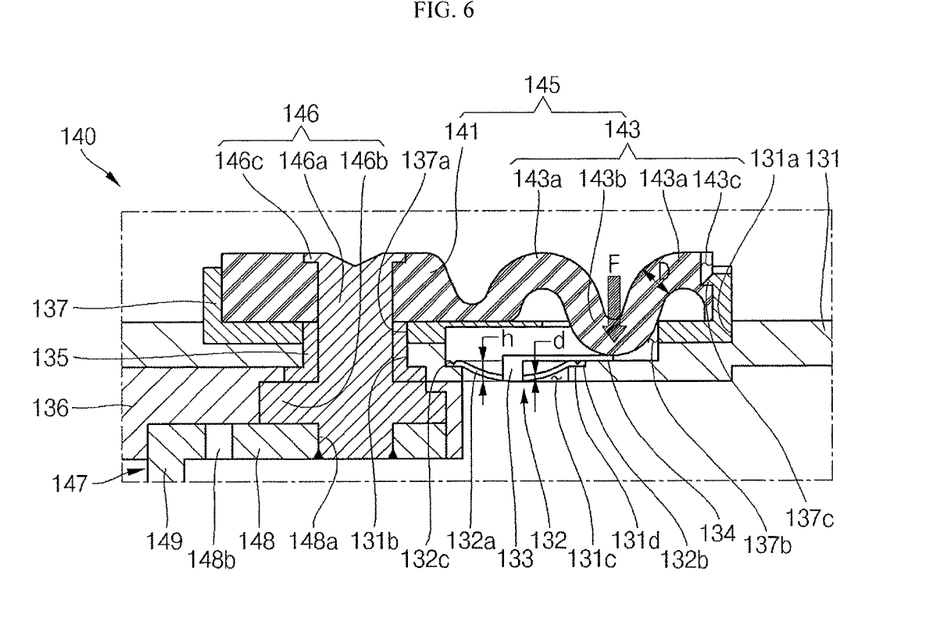
FIG. 6 illustrates a sectional view of the portion 'A' of FIG. 2.

FIG. 1 illustrates a perspective view of a secondary battery 100 according to an embodiment. FIG. 2 illustrates a sectional view of the secondary battery 100 taken along the line I-I' of FIG. 1. FIG. 3 illustrates a perspective view of a first current collector 147 having a fuse region according to an embodiment. FIG. 4 illustrates a perspective view of a second current collector 153 having a fuse region according to an embodiment. FIG. 5 illustrates a perspective sectional view of a portion 'A' of FIG. 2. FIG. 6 illustrates a sectional view of the portion 'A' of FIG. 2. Below, examples of materials to be used will be described, but embodiments are not limited to example materials listed herein.

Referring to FIGS. 1 to 4, the secondary battery 100 includes an electrode assembly 110, a case 120, a cap assembly 130, and electrode terminal portions 140 and 150.

The electrode assembly 110 may be formed by winding or laminating a stacked structure having a first electrode plate 111, a separator 113 and a second electrode plate 112, which are formed of a thin plate or layer. The first electrode plate 111 may function as a negative electrode and the second electrode plate 112 may function as a negative electrode, or vice versa.

The first electrode plate 111 may be formed by applying a first electrode active material, e.g., graphite or carbon, on a first electrode collector formed of metal foil, e.g., nickel or copper foil. The first electrode plate 111 may include a first electrode uncoated portion 111a on which the first electrode active material is not applied. The first electrode uncoated portion 111a may function as a passage for current flowing between the first electrode plate 111 and the outside of the first electrode plate 111.

The second electrode plate 112 may be formed by applying a second electrode active material, e.g., a transition metal, on a second electrode collector plate formed of a metal foil, e.g., aluminum foil. The second electrode plate 112 may include a second electrode uncoated portion 112a on which the second electrode active material is not applied. The second electrode uncoated portion 112a may function as a passage for current flowing between the second electrode plate 112 and the outside of the second electrode plate 112.

In other implementations, the relative polarities of the first and second electrode plates 111 and 112 may differ from what is described above.

The separator 113 may be disposed between the first electrode plate 111 and the second electrode plate 112 to prevent electrical short circuits and allow the movement of lithium ions. The separator 113 may be formed of, e.g., polyethylene, polypropylene, or a composite film of polypropylene and polyethylene.

The electrode assembly 110 and electrolyte are accommodated within the case 140. The electrolyte may include an organic solvent, e.g., ethylene carbonate (EC), propylene carbonate (PC), diethyl carbonate (DEC), ethyl methyl carbonate (EMC), or dimethyl carbonate (DMC), and a lithium salt such as LiPF6 or LiBF4. The electrolyte may be a liquid, a solid, or a gel.

A first electrode terminal portion 140 and a second electrode terminal portion 150 electrically connected to the first electrode plate 111 and the second electrode plate 112, respectively, are coupled to both ends of the electrode assembly 110.

The case 120 may be formed of a conductive metal, e.g., aluminum, an aluminum alloy, or a nickel plated steel, and may have an approximately hexahedron shape provided with an opening through which the electrode assembly 11, the first electrode terminal portion 140, and the second electrode terminal portion 150 are inserted and placed. Since the case 120 and the cap assembly 130 are illustrated in an assembled state in FIG. 2, the opening of the case 120 is not shown. It is to be understood that the opening corresponds to a substantially opened portion of the edge of the cap assembly 130. The inner surface of the case 120 may be treated to be insulated from the electrode assembly 110, the cap assembly 130, the first and second electrode terminal portions 140 and 150, and the cap assembly 130.

The cap assembly 130 may include a cap plate 131, an inversion plate 132, a spacer 133, and an insulation plate 134. In addition, the cap assembly 130 may further include a seal gasket 135, a lower insulation member 136, a plug 138, and a safety vent 139.

The cap plate 131 closes the opening of the case 120. The cap plate 131 may be formed of the same material as that of the case 120. The cap plate 131 may have a terminal groove 131a, a terminal hole 131b, a fixing hole 131c, an electrolyte injection hole 138a, and a vent hole 139b. The terminal groove 131a is a space in which the upper structure of the first electrode terminal portion 140 is placed and fixed and may have a predetermined depth and width. The width of the terminal groove 131a is formed to have substantially the same width as that of the upper insulation member 137. The terminal hole 131b is formed in a bottom surface of the terminal groove 131a, and a first fastening terminal 146 to be described later and the seal gasket 135 may inserted into and passes through the terminal hole 131b. The fixing hole 131b is formed in a bottom surface of the terminal groove 131a and the inversion plate 132 may be installed therein. In addition, a groove 131d may be formed along the upper periphery of the fixing hole 131c. The groove 131d may have a diameter greater than that of the fixing hole 131c. The edge portion 132b of the inversion plate 132 to be described later may be placed in the groove 131d and may be fixed to the cap plate 131, e.g., by welding.

The inversion plate 132 may be installed in the fixing hole 131c. The inversion plate 132 may include a central region having a concave portion 132a that is downwardly concave, i.e., that protrudes from the cap plate 131 towards the electrode assembly 110, and a peripheral region that includes an edge portion 132b surrounding the concave portion 132a and connected to the fixing hole 131c, e.g., is supported by the groove 131d. The concave portion 132a may be shaped as a bowl that is convex toward the electrode assembly 110 and has a predetermined thickness d. The concave portion 132a is configured to be inverted when the internal pressure of the case 120 increases to reach a predetermined level or greater. The inverted direction of the concave portion 132a is the direction away from the electrode assembly 110, and the central portion of the concave portion 132a is upwardly shifted, e.g., will now appear convex to the cap plate 131 and concave to the electrode assembly 100. The edge portion 132b may be placed in the groove 131d formed along the periphery of the fixing hole 131c and may be fixed to the cap plate 131, e.g., by welding.

In addition, the inversion plate 132 seals the fixing hole 131c. A notch 132c may be formed at a boundary portion of the concave portion 132a and the edge portion 132b. In addition, the notch 132c may be formed on the inversion plate 132. When the concave portion 132a is inverted, the notch 132c allows the central portion of the concave portion 132a to be shifted vertically, i.e., way from the electrode assembly 110. The inversion plate 132 may be made of the same material as the cap plate 131, but is not limited thereto.

The spacer 133 may be configured to connect the central region of the inversion plate 132, i.e., a center of the concave portion 132a, and a first side of the insulation plate 134. In addition, the spacer 133 may be formed to have a predetermined height h to allow the insulation plate 134 to be disposed in parallel with the cap plate 131.

The insulation plate 134 is disposed in parallel with the cap plate 131 so as to horizontally move on a top surface of the cap plate 131. To this end, the first side of the insulation plate 134 is connected to the central portion of the inversion plate 132 through the spacer 133, and a second side of the insulation plate 134 extends in parallel with the cap plate 131 so as to be positioned between a short-circuit member 143 and the cap plate 131. The second side of the insulation plate 134 may be fixed between the short-circuit member 143 and the cap plate 131 by an elastic force F exerted by the short-circuit member 143. As shown in FIG. 6, the elastic force F of the short-circuit member 143 is applied toward the cap plate 131, which will be described in more detail below.

The spacer 133 and the insulation plate 134 may be integrally formed and may be made of polypropylene (PP). The spacer 133 and the insulation plate 134 may be formed by double injection molding with the inversion plate 132, but are not limited thereto.

The seal gasket 135 may be formed of an insulating material and may be disposed between the first fastening terminal 146, to be described below, and the cap plate 131 to seal the space between the first fastening terminal 146 and the cap plate 131. In addition, as shown in FIG. 6, the seal gasket 135 may extend up to an inner part of the upper insulation member 137. The seal gasket 135 may prevent the introduction of moisture into the secondary battery 100 or the leakage of the electrolyte from the secondary battery 100.

The lower insulation member 136, formed between each of a first current collector 147 and a second current collector 153, to be described below, and the cap plate 131, may prevent unnecessary electrical short circuits from occurring. In other words, the lower insulation member 136 prevents occurrence of a short circuit between the first current collector 147 and the cap plate 131, and prevents occurrence of a short circuit between the second current collector 153 and the cap plate 131. Since the lower insulation member 136 is formed between the first current collector 147 and the cap plate 131 and between the second current collector 153 and the cap plate 131, unnecessary electrical short circuits between each of the first current collector 147 and the second current collector 153 and the cap plate 131 can be prevented.

The upper insulation member 137 may have an approximately rectangular parallelepiped having an opened top end and may be fixedly placed in the terminal groove 131a of the cap plate 131. A first hole 137a formed at a position corresponding to the terminal hole 131c of the cap plate 131 and a second hole 137b formed at a position corresponding to the short-circuit member 143 may be provided in the bottom surface, i.e., a surface closest to the electrode assembly 100, of the upper insulation member 137. A portion of the short-circuit member 143 may pass through the second hole 137b of the upper insulation member 137. The upper insulation member 137 may be disposed between the cap plate 131 and a terminal plate 145, and may electrically insulate the terminal plate 145 from the cap plate 131. In addition, an engagement protrusion 137c may be formed at a portion of a wall of the upper insulation member 137. The engagement protrusion 137c maintains the elastic force F exerted by the short-circuit member 143, which will later be described below with regard to an engagement groove 143c of the short-circuit member 143.

The plug 138 may close the electrolyte injection hole 138a of the cap plate 131.

The safety vent 139 may be installed in the vent hole 139b of the cap plate 131 and may have a notch 139a configured to be opened at a set pressure.

The electrode terminal portions 140 and 150 may include a first electrode terminal portion 140 and a second electrode terminal portion 150.

The first electrode terminal portion 140 may be formed of a metal or an equivalent thereof and may be electrically connected to the first electrode plate 111. The first electrode terminal portion 140 may be formed of, e.g., copper, a copper alloy or an equivalent thereof. The first electrode terminal portion 140 may include the terminal plate 145, the first fastening terminal 146, and the first current collector 147.

The first fastening terminal 146, passing through the cap plate 131, may protrude upwardly by a predetermined length, and may be electrically connected to the first current collector 147 at a lower side of the cap plate 131. The first fastening terminal 146 may be formed of any suitable material, e.g., copper, a copper alloy, or an equivalent thereof. The first fastening terminal 146 may include a first body part 146a, a first flange part 146b, and a first fixing part 146c.

The first body part 146a may be divided into an upper pillar protruding to an upper portion of the cap plate 131 and a lower pillar connected to a lower portion of the upper pillar and extending to a lower portion of the cap plate 131. Here, the first body part 146a may have a cylindrical shape, but not limited thereto.

The first flange part 146b may be formed to horizontally extend from a side part of the lower pillar of the first body part 146a. The first flange part 146b prevents the first fastening terminal 146 from being dislodged from the cap plate 131. A portion of the lower pillar of the first body part 146a, which is connected to the lower portion of the first flange part 146b, may be fitted into a terminal hole 148a of the first current collector 147 and then secured, e.g., welded.

The first fixing part 146c may be formed to horizontally extend from a side part of an end of the upper pillar of the first fastening terminal 146. The first fixing part 146c may fix the first fastening terminal 146 to the terminal plate 145. The first fixing part 146c may be formed by riveting the end of the upper pillar of the first fastening terminal 146. Accordingly, the terminal plate 145, together with the upper insulation member 137, may be fixed to the top portion of the cap plate 131 by the first fixing part 146c.

The terminal plate 145 may be disposed to be spaced apart from the upper portion of the cap plate 131. Specifically, the terminal plate 145 may include a first electrode fastening part 141 and the short-circuit member 143.

The first electrode fastening part 141 may have an approximately plate shape and may be coupled to the first fastening terminal 146 by the first fixing part 146c of the first fastening terminal 146 to then be fixed to the cap plate 131, together with the upper insulation member 137. The first electrode fastening part 141 may be electrically insulated from the cap plate 131 by the upper insulation member 137.

The short-circuit member 143 may include one or more first bent portions 143a having a predetermined thickness D (see FIG. 6), extending from a first side of the first electrode fastening part 141 and bent in a first direction and a second bent portion 143b bent in a second direction opposite to the first direction between the one or more first bent portions 143a. The first direction may mean a direction away from the cap plate 131 and the second direction may mean a direction approaching the cap plate 131. In other words, the first bent portions 143a may be upwardly bent and the second bent portion 143b may be downwardly bent relative to the cap plate 131. An absolute value of a height of the second bent portion 143b may be greater than that of the first bent portions 143a. In other words, the second bent portion 143b may extend below an upper surface of the cap plate 131, i.e., a surface of the cap plate 131 furthest from the electrode assembly 100, than the first bent portion 143a extends above the upper surface of the cap plate 131. In particular, a bottom portion of the second bent portion 143b may come into contact with a top surface of the insulation plate 134 through the second hole 137b of the upper insulation member 137.

A first side of the short-circuit member 143 may be electrically connected to the first electrode fastening part 141 and a second side of the short-circuit member 143 may include the engagement groove 143c. The engagement protrusion 137c formed in the upper insulation member 137 may be coupled with the engagement groove 143c. Since the engagement protrusion 137c is inserted into the engagement groove 143c, the short-circuit member 143 can be fixed on the cap plate 131, and a predetermined pressure is applied to the short-circuit member 143 in a direction toward the cap plate 131, thereby increasing the electric force F of the short-circuit member 143. That is to say, the engagement protrusion 137c increases a force pressing the cap plate 131 at the other side of the short-circuit member 143, thereby increasing the elastic force F of the short-circuit member 143.

A configuration of the short-circuit member 143 is not limited to that illustrated herein, and the short-circuit member 143 may be designed in various manners so as to apply the electric force F in a direction toward the cap plate 131. In the present embodiment, the magnitude of the electric force F of the short-circuit member 143 may be determined according to the coupling position of the first electrode fastening part 141 and the bending extent of the second bent portion 143b. For example, as the first electrode fastening part 141 is connected to be closer to the cap plate 131 or the second bent portion 143b has a greater height, the electric force F applied in a direction toward the cap plate 131 may increase.

The first current collector 147 may include a first coupling part 148 and a first extension part 149, and may have an approximately 'L' shape or an inverted 'L' shape The first coupling part 148 is installed between a top portion of the electrode assembly 110 and a bottom portion of the cap assembly 130, and may be plate shaped.

Referring to FIG. 3, the first coupling part 148 may include a first fuse region 148c at a first side of the first coupling part 148 and a terminal hole 148a at a second side of the first coupling part, spaced away from the first fuse region 148c. The first fastening terminal 146 may be fitted into the terminal hole 148a and may be coupled to the terminal hole 148a, e.g., by welding or riveting. A first fuse hole 148b may be formed in the first fuse region 148c of the first coupling part 148. The first fuse hole 148b makes the first fuse region 148c of the first current collector 147 have a smaller sectional area than the other region of the first current collector 147, except for a region having the terminal hole 148a formed therein. The first fuse hole 148b is shaped of a rectangle elongated in a width direction of the first coupling part 148, but the shape and number of the first fuse hole 148b are not limited thereto. The first fuse hole 148b makes the first fuse region 148c have a smaller sectional area than the other region of the first current collector 147. Therefore, when short circuiting occurs in the secondary battery 100, a high current flows through the first current collector 147, so that heat may be generated. In this case, the first fuse region 148c is melted by the heat to break the current flow between the electrode assembly 110 and each of the electrode terminal portions 140 and 150.

The first extension part 149 is bent and extended from an end of the first coupling part 148 and is shaped of a plate substantially contacting the first electrode uncoated portion 111a. Designating a corner at which the first coupling part 148 and the first extension part 149 meet 'C', the first coupling part 148 and the first extension part 149 may be perpendicular to each other relative to the corner C. In the illustrated embodiment, the first fuse region 148c is formed in the first coupling part 148 away from the corner C, but embodiments are not limited thereto. For example, the first fuse region 148c may be formed in a region of the first extension part 149 not contacting an electrolytic solution, i.e., a region closer to the corner C.

The second electrode terminal portion 150 may be generally formed of a metal or an equivalent thereof and may be electrically connected to the second electrode plate 112. The second electrode terminal portion 150 may be formed of a conductive metal, e.g., aluminum, an aluminum alloy, or a nickel plated steel. The second electrode terminal portion 150 may include a second electrode fastening part 151, a second fastening terminal 152, and a second current collector 153.

The second fastening terminal 152, passing through the cap plate 131, may protrude upwardly by a predetermined length and may be electrically connected to the second current collector 153 at a lower side of the cap plate 131. The second fastening terminal 152 may include a second body part 152a, a second flange part 152b, and a second fixing part 152c.

The second body part 152a may be divided into an upper pillar protruding to an upper portion of the cap plate 131 and a lower pillar connected to a lower portion of the upper pillar and extending to a lower portion of the cap plate 131. Here, the second body part 152a may have a cylindrical shape, but not limited thereto.

The second flange part 152b may be formed to horizontally extend from a side part of the lower pillar of the second body part 152a. The second flange part 152b prevents the second fastening terminal 152 from being dislodged from the cap plate 131. A portion of the lower pillar of the second body part 152a, which is connected to the lower portion of the second flange part 152b, may be fitted into a terminal hole 154a of the second current collector 153 and then secured, e.g., welded.

The second fixing part 152c may be formed to horizontally extend from a side part of an end of the upper pillar of the second fastening terminal 152. The second fixing part 152c may fix the second fastening terminal 152 to the second electrode fastening part 151. The second fixing part 152c may be formed by riveting the end of the upper pillar of the second fastening terminal 152. Accordingly, the second electrode fastening part 151 may be fixed to the top portion of the cap plate 131 by the second fixing part 152c.

The second electrode fastening part 151 may be roughly in the shape of a plate and may be coupled to the second fastening terminal 152 by the second fixing part 152c of the second fastening terminal 152 to then be fixed to the cap plate 131.

Referring to FIG. 4, the second current collector 153 may include a second coupling part 154 and a second extension part 155. The second coupling part 154 is installed between the top portion of the electrode assembly 110 and the bottom portion of the cap assembly 130, and may be plate shaped. The second coupling part 154 may include a second fuse region 154c at a first side and a terminal hole 154a at a second side, spaced from the second fuse region 154c. The second fastening terminal 152 is fitted into the terminal hole 154a and may be coupled to the terminal hole 154a by welding or riveting. A second fuse hole 154b may be formed in the second fuse region 154c of the second coupling part 154. The second fuse hole 154b makes the second fuse region 154c of the second current collector 153 have a smaller sectional area than the other region of the second current collector 153, except for a region having the terminal hole 154a formed therein. The second fuse hole 154b is shaped of a rectangle elongated in a width direction of the second coupling part 154, but the shape and number of the second fuse hole 154b are not limited thereto. The second fuse hole 154b makes the second fuse region 154c have a smaller sectional area than the other region of the second current collector 153. Therefore, when short circuiting occurs to the secondary battery 100, a high current flows through the second current collector 153, so that heat may be generated. In this case, the second fuse region 154c is melted by the heat to break the current flow between the electrode assembly 110 and each of the electrode terminal portions 140 and 150.

The second extension part 155 may be bent and extend from an end of the second coupling part 154, and may be plate shape substantially contacting the second electrode uncoated portion 112a. Designating a corner at which the second coupling part 154 and the second extension part 155 meet by 'C', the second coupling part 154 and the second extension part 155 may be perpendicular to each other relative to the corner C. In the illustrated embodiment, the second fuse region 154c is formed in the second coupling part 154, but embodiments are not limited thereto. The second fuse region 154c may be formed in a region of the second extension part 155 not contacting an electrolytic solution, that is, a region near the corner C.

Figure 7:
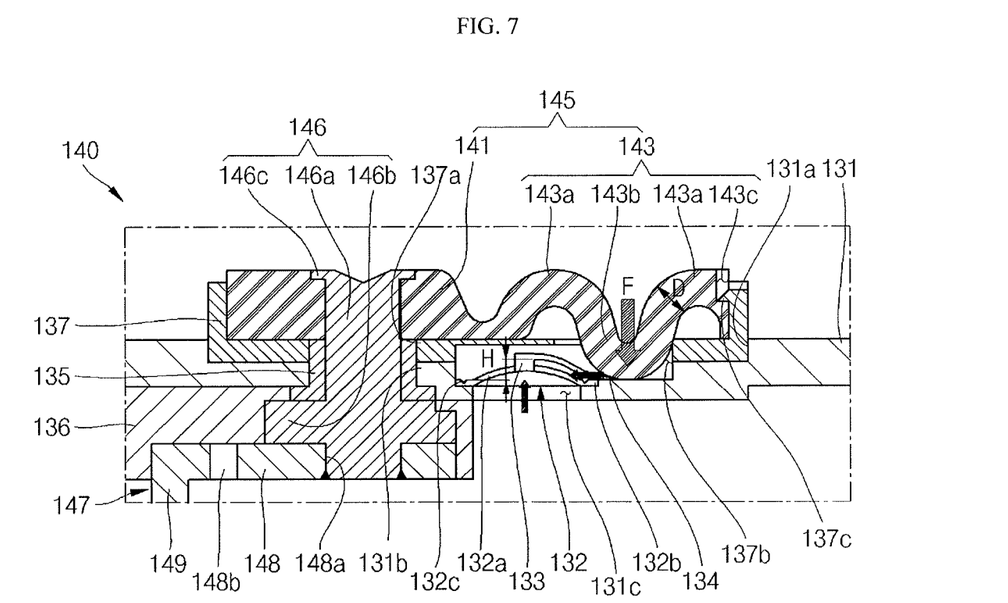
FIG. 7 illustrates operations of an inversion plate, an insulation plate, and a short-circuit member according to an embodiment.

FIG. 7 illustrates operations of the inversion plate 132, the insulation plate (134), and the short-circuit member 143.

First, when the internal pressure of the secondary battery 100 is greater than or equal to a critical level due to overcharge, the inversion plate 132 is inverted to convexly protrude upwardly, i.e., in a direction away from the electrode assembly 110. Accordingly, the central portion of the concave portion 132a is shifted in a vertical direction, and the spacer 133 is also shifted together with the central portion of the concave portion 132a. A height H of the inversion plate 132 after being inverted may be greater than a height h of the inversion plate 132 before being inverted, because the notch 132c reduces resistance of the inverted concave portion 132a to then increase an inverted height of the concave portion 132a and to increase the height of the inversion plate 132 by a height of the spacer 133. That is to say, before the inverting operation, the spacer 133 is positioned within the concave portion 132a and accounts for only a small portion of the height of the inversion plate 132. However, after the inverting operation, the spacer 133 is positioned on the convexly protruding concave portion 132a, so that the height of the inversion plate 132 is increased by the height of the spacer 133.

After the inverting operation, the height of the inversion plate 132 is relatively increased, so that the first side of the insulation plate 134 is upwardly lifted along with the inversion plate 132 and the second of the insulation plate 134 is shifted horizontally toward the inversion plate 132. The second side of the insulation plate 134 is positioned between a bottom portion of the second bent portion 143b of the short-circuit member 143 and the cap plate 131 and then horizontally shifted after the inversion plate 132 is inverted, so that the second side of the insulation plate 134 is dislodged from a region between the bottom portion of the second bent portion 143b of the short-circuit member 143 and the cap plate 131. In this case, since the force F is applied to the second bent portion 143b toward the cap plate 131, the short-circuit member 143 comes into contact with the cap plate 131 to then be short-circuited. In other words, since the first side of the insulation plate 134 is connected to the spacer 133 which connected to the concave portion 132a, the inversion of the concave portion 132a pulls the insulation plate 134 towards the concave portion 132a, allowing the short circuit member 143 to contact the cap plate 131.

Conventionally, a short circuit was induced in such a manner an inversion plate having the same polarity with the cap plate and configured to be invertible electrically contacts a member having a different polarity therefrom.

In such a case, however, the inversion plate has a very small thickness (e.g., 0.5 mm) to be inverted, so that it is easily melted by heat generated due to short-circuiting even if it makes contact with the member, thereby readily generating a hole. The generated hole may make the inversion plate and the member to be electrically disconnected from each other, and an electrical contact time long enough to melt a fuse to be cut off cannot be secured, resulting in a malfunction of the fuse.

However, according to the embodiments, the inversion plate does not directly produce the short-circuit, but indirectly produces the short-circuit. That is to say, a separate short-circuit member having a greater thickness than the inversion plate directly short-circuits the cap plate, so that a short-circuited state can be more stably maintained. In this case, an electrical contact time long enough to melt a fuse to be cut off can be secured, thereby eliminating a malfunction of the fuse.

Thus, according to embodiments, a secondary battery, which can maintain a short-circuited state in a more stable manner during an over-charge, is provided, thereby eliminating a malfunction of a fuse.

While the invention has been described in connection with certain exemplary embodiments, it will be understood by those skilled in the art that the invention is not limited to the disclosed embodiments, but rather is intended to cover various modifications included within the spirit and scope of the appended claims and equivalents thereof. Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A secondary battery, comprising:
an electrode assembly;
a case accommodating the electrode assembly;
a cap assembly including a cap plate covering the case, an inversion plate in the cap plate, and an insulation plate having a first side connected to the inversion plate and a second side positioned on the cap plate, wherein the inversion plate is configured to be inverted when the internal pressure of the case is greater than or equal to a critical level; and
an electrode terminal portion including a fastening part electrically connected to the electrode assembly and a short-circuit member electrically connected to the fastening part, the short-circuit member being configured to make contact with a top portion of the insulation plate when an elastic force is applied on the short-circuit member toward the cap plate.

2. The secondary battery as claimed in claim 1, wherein the electrode terminal portion further includes:
- a current collector electrically connected to the electrode assembly; and
- a fastening terminal electrically connected to the current collector and the fastening part.

3. The secondary battery as claimed in claim 2, wherein the current collector has a fuse region having a sectional area smaller than the other area of the current collector.

4. The secondary battery as claimed in claim 1, wherein the cap plate includes a fixing hole in which the inversion plate is installed, the inversion plate including a concave portion configured to be invertible and an edge portion surrounding the concave portion and fixing the inversion plate in the fixing hole.

5. The secondary battery as claimed in claim 4, further comprising a notch at a boundary portion of the concave portion and the edge portion.

6. The secondary battery as claimed in claim 5, wherein the notch is on the inversion plate.

7. The secondary battery as claimed in claim 1, wherein the insulation plate is disposed to be parallel to the cap plate.

8. The secondary battery as claimed in claim 1, wherein the first side of the insulation plate is connected to a central portion of the inversion plate.

9. The secondary battery as claimed in claim 8, wherein the cap assembly further includes a spacer connecting the central portion of the inversion plate and the first side of the insulation plate.

10. The secondary battery as claimed in claim 9, wherein the spacer has a predetermined height so as to allow the insulation plate and the cap plate to be parallel to each other.

11. The secondary battery as claimed in claim 1, wherein, when inverted, a central portion of the inversion plate moves away from the electrode assembly, the insulation plate is shifted in a horizontal direction with respect to the cap plate, and the short-circuit member electrically contacts the cap plate.

12. The secondary battery as claimed in claim 1, wherein a height of the inversion plate after being inverted is greater than a height of the inversion plate before being inverted.

13. The secondary battery as claimed in claim 1, wherein the fastening part and the short-circuit member are integrally formed.

14. The secondary battery as claimed in claim 1, wherein the short-circuit member has a thickness greater than that of the inversion plate.

15. The secondary battery as claimed in claim 1, wherein the short-circuit member includes one or more first bent portions bent in a first direction and one or more second bent portions bent in a second direction opposite to the first direction between the first bent portions.

16. The secondary battery as claimed in claim 15, wherein the first direction is a direction away from the cap plate and the second direction is a direction approaching to the cap plate.

17. The secondary battery as claimed in claim 1, further comprising an insulation member between the electrode terminal portion and a top portion of the cap plate, the insulating member insulating the electrode terminal portion from the cap plate.

18. The secondary battery as claimed in claim 17, wherein the short-circuit member includes a first side that is electrically connected to the fastening part and a second side having an engagement groove, and the insulation member includes an engagement protrusion corresponding to the engagement groove.

19. The secondary battery as claimed in claim 18, wherein the engagement protrusion is inserted into the engagement groove to apply a predetermined pressure to the short-circuit member in a direction approaching the cap plate.

* * * * *